US006628736B1

(12) United States Patent
Legrand et al.

(10) Patent No.: US 6,628,736 B1
(45) Date of Patent: Sep. 30, 2003

(54) ESTIMATING THE OPTIMAL SAMPLING INSTANT IN A TDMA PACKET TRANSMISSION SYSTEM

(75) Inventors: Delphine Legrand, Paris (FR); Américo Brajal, Villeneuve-le-Roi (FR); Antoine Chouly, Paris (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 319 days.

(21) Appl. No.: 09/709,264

(22) Filed: Nov. 9, 2000

(30) Foreign Application Priority Data

Nov. 10, 1999 (FR) .............................. 99 14182

(51) Int. Cl.[7] .......................... H01L 7/00; H01L 27/22; H03D 3/22; H03D 3/00
(52) U.S. Cl. ......................... 375/355; 375/332; 329/306
(58) Field of Search ................................. 375/355, 332; 329/306

(56) References Cited

U.S. PATENT DOCUMENTS

| | | | | |
|---|---|---|---|---|
| 4,389,727 A | * | 6/1983 | Rouffet ....................... 327/553 |
| 5,283,815 A | * | 2/1994 | Chennakeshu et al. ..... 375/330 |
| 5,537,435 A | * | 7/1996 | Carney et al. ............... 375/219 |
| 5,570,396 A | * | 10/1996 | Bergmans et al. .......... 375/355 |
| 5,640,125 A | * | 6/1997 | Alard .......................... 329/306 |
| 5,659,573 A | * | 8/1997 | Bruckert et al. ............ 375/200 |
| 5,809,086 A | * | 9/1998 | Ariyavisitakul ............. 375/332 |
| 6,292,051 B1 | * | 9/2001 | Su et al. ...................... 329/313 |

OTHER PUBLICATIONS

"Digital Communication Receivers Synchronisation Channel Estimation and Signal Processing", by de Heinrich Meyr et al, Wiley Series, pp. 283–289.
PHF 99,592, U.S. Ser. No. 09/688,643, Filed Oct. 16, 2000.

* cited by examiner

*Primary Examiner*—Mohammad H. Ghayour
(74) *Attorney, Agent, or Firm*—Laurie E. Gathman

(57) ABSTRACT

The invention relates to a system for transmitting TDMA packets between interactive terminals and a head station via a transmission medium, in which the receiver effects a oversampling of the received signal so as to retrieve the optimal sample corresponding to the transmitted symbol. The invention proposes a method of recovering this optimal sampling instant very rapidly by performing a polynomial interpolation computation between the generated oversamples so as to derive the optimal sampling instant and by filtering the received signal by means of a low-pass filter centered at the optimal sampling instant.

8 Claims, 3 Drawing Sheets

ESTIMATING THE OPTIMAL SAMPLING INSTANT IN A TDMA PACKET TRANSMISSION SYSTEM

BACKGROUND OF THE INVENTION

The invention relates to a receiver for a packet transmission system comprising receiving means for receiving a signal at a symbol frequency, oversampling means for generating oversamples from the received signal at a frequency which is a multiple of the symbol frequency, and a device for searching the optimal sampling instant for estimating, on the basis of the generated oversamples, a delay corresponding to the received signal.

The invention also relates to a packet transmission system comprising such a receiver.

The invention further relates to a method of estimating an optimal sampling instant at the receiver end for a packet transmission system, the method comprising the steps of
  receiving a signal referred to as received signal,
  oversampling for generating oversamples from the received signal,
  searching an optimal sampling instant for estimating, on the basis of the generated oversamples, a delay corresponding to the received signal.

The invention finds important applications in the field of satellite or cable transmissions and notably in return path transmissions in which a plurality of terminals is capable of transmitting data packets to a head station in accordance with a time-division multiplex mechanism.

The article entitled "Digital Communication Receivers Synchronization Channel Estimation and Signal Processing" by H. Meyr, M Moeneclay and S. Fechtel published in the Wiley Series in Telecommunications and Signal Processing, pp. 285 to 289, describes a technique for computing the optimal sampling instant. In the majority of time-division transmission systems it is necessary to effect a oversampling at the receiver end so as to retrieve the sampling instant used at the transmitter end. The technique described in the quoted article recommends computation of the average energies of each sample for selecting the optimal sample having the maximum average energy. This technique is costly as regards the number of computations because it necessitates computation of the average energy of all the received samples representing a symbol transmitted before deciding which is the optimal sample.

SUMMARY OF THE INVENTION

It is a particular object of the invention to provide the possibility of very rapidly recovering the optimal sampling instant by considerably limiting the number of computations and thus the operating costs. To this end, the receiver as described in the opening paragraph is characterized in that said receiving means comprise a low-pass filter and centering means for centering the low-pass filter as a function of said delay.

In accordance with an important characteristic feature of the invention, the device for searching the optimal sampling instant comprises a computing member for determining the maximum of the average amplitudes of the oversamples, and an interpolator for computing a polynomial through at least three of said average amplitudes, among which the maximum amplitude, and for deriving said delay estimation therefrom.

The invention has the advantage that it provides the possibility of very rapidly recovering the optimal sampling instant with a small number of computations so that it is possible to carry out this operation for every new packet received from any one of the terminals of the system.

These and other aspects of the invention are apparent from and will be elucidated with reference to the embodiments described hereinafter.

DESCRIPTION OF THE PREFERRED EMBODIMENTS

Figure 1:
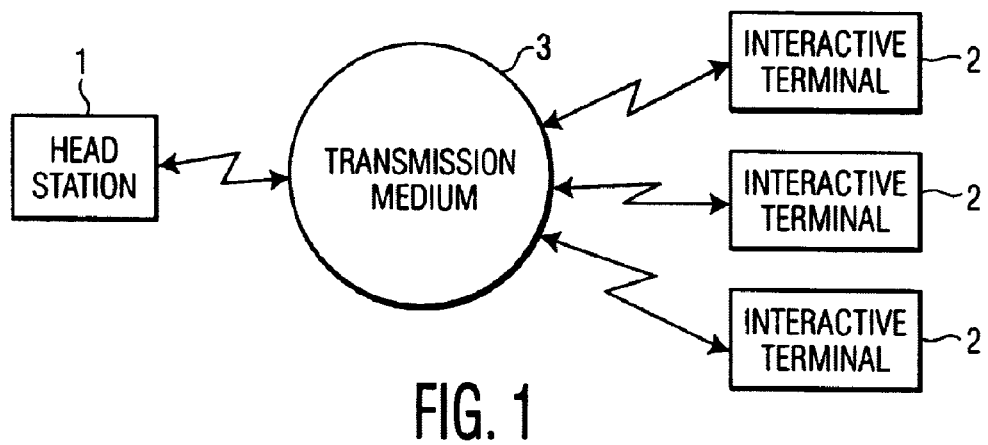
FIG. 1 shows an embodiment of the transmission system according to the invention.

A transmission system according to the invention is shown by way of example in FIG. 1. It comprises a head station 1 and a plurality of interactive terminals 2 which are capable of transmitting and receiving data to and from the head station by using a transmission medium 3. The transmissions from the terminals to the head station are qualified as ascending transmissions. The transmissions from the head station to the terminals are qualified as descending transmissions. In the ascending transmissions, the head station 1 has the function of a receiver. In the descending transmissions, each terminal has the function of a receiver. Access of the terminals to the transmission medium is realized, for example, by using a time division multiple access mechanism, possibly combined with a frequency division multiple access mechanism. The transmission medium may be of different types, for example, a cable, radio, satellite, etc.

In a time division packet transmission system, different terminals may transmit data or symbols in consecutive time intervals at different sampling instants because their transmission clocks are not synchronous. Moreover, these clocks are liable to present a certain jitter. Two packets transmitted by the same transmitter thus do not necessarily have the same optimal sampling instant. Moreover, distortions in the channel may cause a shift upon arrival. The head station or the receiver (which may be another terminal in the case of a point-to-point system) must thus effect a oversampling, i.e. use a clock which is a multiple of the theoretical sampling frequency so as to retrieve the sampling instant used at the transmitter end for transmitting the symbols. For example, the oversampling frequency may be 16 times higher than the symbol frequency, which means that 16 samples must be extracted during the period of a received symbol. A single one of these samples is optimal, i.e. it is proximate to the instant when the transmitter has transmitted the symbol. The optimal sampling instant may vary from one packet to the other, which is why the head station has little time to retrieve the optimal sampling instant, i.e. corresponding to the sample which is nearest to the symbol transmitted by the different terminals. The invention notably has the advantage that the optimal sampling instant can be more rapidly retrieved than in the majority of conventional methods by considerably reducing the number of performed operations.

Figure 2:
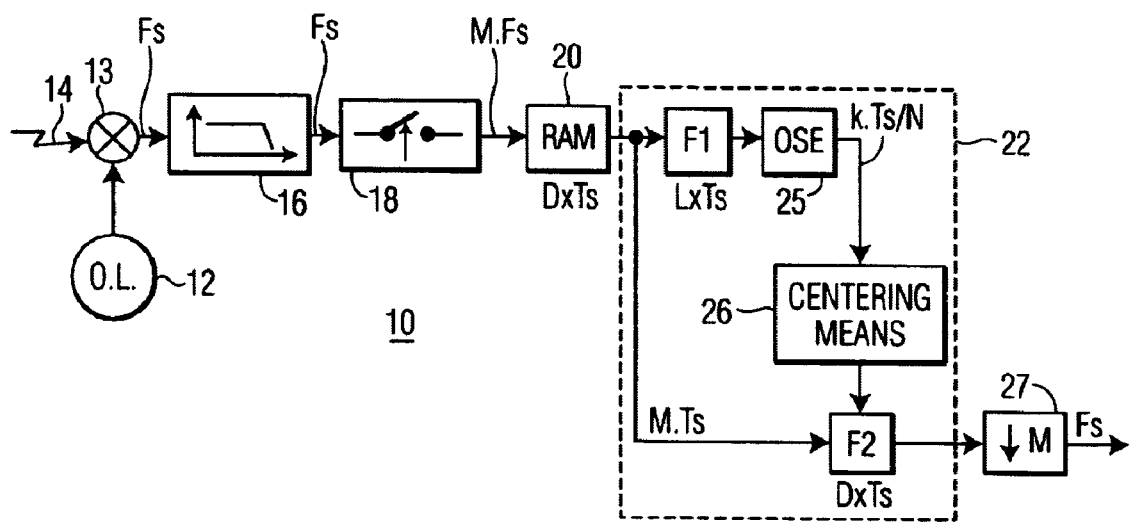
FIG. 2 shows a general circuit diagram of an embodiment of a receiver according to the invention.

A general circuit diagram of the receiver 10 according to the invention is shown in FIG. 2. It comprises a local oscillator 12 and a mixer 13 for transposing the received signal 14 at the symbol frequency $F_s$ in such a way that the spectrum of the transposed signal is centered at zero plus or minus a frequency error caused by the fact that the local oscillators used for transmission at the carrier frequencies are not perfect. The transposed signal is then filtered by a rejection filter 16 so as to eliminate the frame frequencies around 2Fp where Fp is the transmitter carrier frequency, as well as other carriers used in the system. The signal obtained at the output of the rejection filter 16 is sampled by a oversampling device 18 having an integral factor of M and intended to generate M oversamples denoted $S_0$ to $S_{M-1}$ for each symbol of the transposed signal. According to the invention, the oversamples are generated at the frequency $M \times F_s$ with $M \geq 3$.

The precision of the optimal sampling instant is denoted $T_s/N$ where $T_s$ is the duration of the symbol and N is a number of symbol samples corresponding to the searched precision. In accordance with this embodiment, the number M of oversamples generated by the oversampling device 18 is smaller than or equal to N, with $N \geq M \geq 3$. For example, for N=16, one may take M=3.

The oversamples are subsequently stored in a memory 20, denoted RAM in FIG. 2, so as to be treated by a device 22 for estimating the optimal sampling instant, intended to retrieve the optimal sampling instant corresponding to the transmitted symbol. The number of samples stored in the memory 20 is equal to D×M where D is the number of symbols in a packet and M is the number of oversamples per symbol. They correspond to a duration which is equal to $D \times T_s$ where $T_s$ is the duration of a symbol. The device 22 for estimating the optimal sampling instant comprises a first low-pass filter F1 for filtering a part of the samples stored in the memory 20, corresponding to a duration $L \times T_s$, with $L \leq D$. The filter F1 is of the Nyquist edge type centered around zero, also referred to as optimal filter adapted to the filter used at the transmitter end. A device 25 for searching the optimal sampling instant OSE receives the M×L samples filtered by the first filter F1 at M times the symbol frequency $F_s$ for computing, on the basis of these samples, the optimal sample corresponding to the transmitted symbol among the N possible samples. The optimal sampling instant is thus obtained with the searched precision which is equal to $T_s/N$. A second low-pass filter F2 of the Nyquist edge type which is substantially identical to the first filter F1 is used this time for filtering the samples stored in the memory 20 throughout the duration of the packet, i.e. with a computing window having a duration of $D \times T_s$. As the position denoted k (k integer) is known, or the delay denoted $k \times T_s/N$ of the optimal sample in the received packet, centering means 26 are provided for temporally centering the filter F2 at the delay corresponding to this optimal sample. For example, if the filter F2 is a digital filter having programmable coefficients, the centering means 26 allow programming of the coefficients of the filter F2 in that its pulse response can be centered at the previously computed optimal sample, i.e. at the instant $k \times T_s/N$. The samples are supplied at the output of the second filter F2 at the frequency of $M \times F_s$. To retrieve a signal at the symbol frequency, a decimation device 27 is provided for selecting, among the M samples per symbol at the output of the second filter F2, only the first sample corresponding to the optimal sampling instant.

Figure 3:
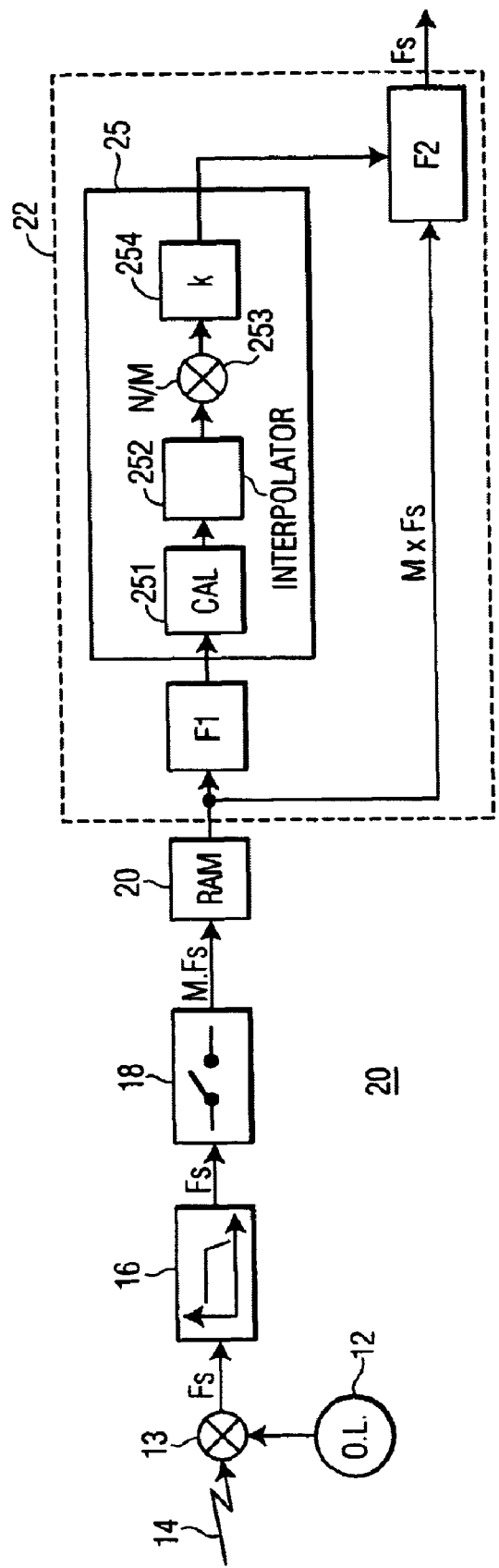
FIG. 3 shows a preferred embodiment of the receiver of FIG. 2.

A preferred embodiment of a receiver 20 according to the invention is shown by way of example in FIG. 3, in which the blocks having functions which are identical to the functions of the blocks in FIG. 2 are denoted by the same reference signs. The device 25 for searching the optimal sampling instant comprises a computing member 251 for computing the average amplitudes in the computing window L of each one of the M oversamples per symbol, denoted $S_0$ to $S_{M-1}$, generated by the oversampling device 18 and for deriving the sample having the maximum average amplitude representing a first estimation of the optimal sample. In conformity with the system considered, the DC function of the average amplitudes of the oversamples capable of representing the transmitted symbols comprises a single maximum at the symbol duration. By choosing a sufficient oversampling factor M, the discrete function of the amplitudes of these oversamples has also only one single maximum which represents a first estimation of the optimal sample. An interpolator 252 subsequently performs an interpolation between at least three average values precomputed by the computing member 251, among which the previously computed maximum, for obtaining a better approximation of the real maximum of the DC function of the average amplitudes of the oversamples. This new maximum corresponds to a new estimation of the optimal sampling instant, denoted x.

In accordance with a first variant of an embodiment of the invention, a multiplier 253 is provided for multiplying the estimation x obtained at the output of the interpolator 252 by the coefficient N/M so as to retrieve the computed sampling instant on the searched precision list. Subsequently, one determines, with the aid of, for example, a comparator 254, the integer k which is nearest to the obtained product x×N/M which indicates the position of the optimal sample in the symbol duration corresponding to the sample with the index k, denoted $S_K$ where $0 \leq k \leq N-1$, among the N possible samples, denoted $S_0$ to $S_{N-1}$. In accordance with this variant, the centering means 26 center the pulse response of the second filter F2 at the optimal sample $S_K$ having a delay which is equal to $k \times T_s/N$ with respect to the zero sample. To this end, the centering means 26 compute the coefficients of the second filter F2 in order that its pulse response, denoted h(t), sampled at $M \times F_s$ is shifted by $-k \times T_s/N$ with respect to zero. Then there are N possible values for each coefficient of the filter in accordance with the N possible values of k representing the N possibilities for the optimal sampling instant. In practice, the centering means 26 precompute these values for every possible sampling instant and store them in tables so as to prevent computation for every received packet.

In accordance with a second variant of an embodiment of the invention, the centering means 26 can compute the coefficients of the second filter F2 for the true theoretical optimal sampling instant denoted x, provided by the interpolator 252. In accordance with this second variant, the filter coefficients must be recomputed for every new packet because the theoretical optimal value is an arbitrary value which may be different for every received packet. This variant has the advantage that it requires less memory capacity than the previous variant but has the drawback that it requires a large computing power so as to be capable to recompute all the filter coefficients for each packet.

In parallel with the two variants described hereinbefore, there are several possible implementations for realizing the second filter F2 as well as the centering means 26 and the decimation means 27. For example, a computer of the digital signal processor, or DSP type may be used advantageously for implementing the centering means 26 and the second filter F2 in accordance with a first possible implementation which does not require the separate operation of decimation. In contrast, when the decimation operation 27 is performed, a conventional filtering circuit is more economical for the filter F2, with the centering means 26 then serving for a selection of the appropriate coefficient table as a function of the computed delay x, provided by the device 25 for searching the optimal sampling instant.

In accordance with the implementation using decimation 27, the filter F2 receives M samples at the input and supplies M samples at the output, which are shifted by $k \times T_s/N$ with respect to the input samples. As only the first sample is significant, a device 27 for decimation by M may be provided at the output of the second filter for selecting only the first sample. On the other hand, according to the implementation without decimation, it is more advantageous to program the signal processor in such a way that it convolutes the filtering only once throughout the duration of the packet $D \times T_s$ for generating the optimal sample at the frequency $F_s$. The computation of the other samples is superfluous. In accordance with this implementation, it is not useful to provide a separate decimator 27 because the filtering and the decimation are simultaneously performed by the filter F2.

The results are independent of the method used for computing the average amplitude. One may use, for example, the square power method which consists for each sample of computing the sum of the square powers of all the samples comprised in the computing window used and having the same position in the received packet, i.e. spaced part by the duration of the transmitted symbol, denoted $T_s$, or the method known as eye diagram, in which the sum of the absolute values instead of the sum of the square powers is computed.

Figure 4:
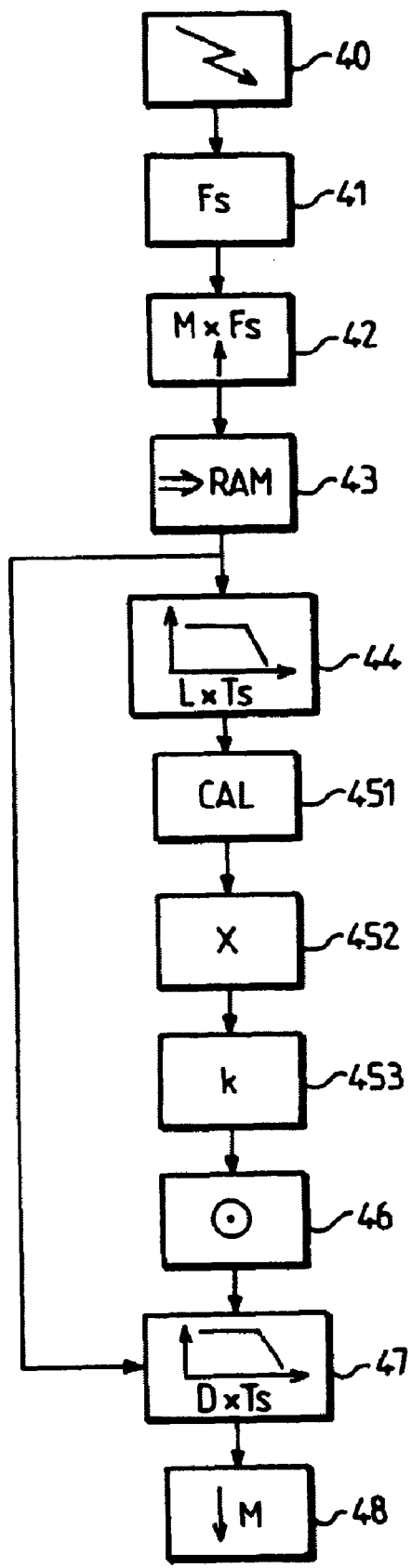
FIG. 4 shows an example of the method according to the invention.

FIG. 4 shows the different steps of a preferred embodiment of a method of estimating the optimal sampling instant according to the invention, which can be carried out in the device 22 for estimating the optimal sample. This method comprises the following steps:

step 40: reception of the signal comprising the data packets representing, for example, transmitted symbols, each packet comprising D symbols, step 41: conversion of the received signal in the baseband, step 42: oversampling of the baseband signal for obtaining M samples per symbol, with M>2, step 43: storage of samples corresponding to a packet of received symbols, i.e. at a duration which is equal to $D \times T_s$ where D is the number of symbols in a packet, step 44: first low-pass filtering of a piece of the stored packet, i.e. at a duration which is equal to $L \times T_s$, with $L \leq D$, by means of a first Nyquist edge filter adapted to the filter used at the transmitter end, for which, for example, L=128 symbols can be taken, while the value of L may be dependent on the noise (with a value of L which is not too small) and/or on imperfections of the system such as the carrier frequency width or the sampling frequency between the transmitter and the receiver (with a value of L which is not too large), step 45: estimation of the delay of the optimal sample, step 46: computation of the coefficients of a second Nyquist edge digital filter as a function of the delay estimated in step 45 for centering the second filter at the instant corresponding to this delay, step 47: second low-pass filtering of all the samples stored during step 43, i.e. at a duration which is equal to $D \times T_s$, with the aid of the second Nyquist filter, step 48: possible decimation for preserving only one sample per symbol in the M samples supplied at the output of the second filtering, corresponding to the optimal sample.

The step 45 comprises the following sub-steps:

step 451: computation of a discrete function in an observation window having a duration of $L \times T_s$ of the average amplitude of M samples stored per symbol, having predefined sampling instants $k \times T_s/M$ for $0 \leq k < M-1$ and determination of the maximum, step 452: polynomial interpolation for determining an optimal instant denoted x, with $0 \leq x < M$ corresponding to the maximum of a polynomial of a degree which is higher than or equal to 2 passing through a predefined number of points of the function computed in step 451, among which the maximum, step 453: determination of the integer k which is nearest to the value $x \times N/M$ corresponding to the previously computed instant for the searched precision so as to determine the optimal sampling instant which is equal to $k \times T_s/N$ among the N possible instants.

For the interpolation performed in step 452, one prefers a parabolic interpolation between three points among the stored M samples per symbol, whose average amplitudes have been computed in step 451, among which: the sample indicated B and denoted $S_B$ having the maximum average amplitude and the two adjacent samples indicated A and C and denoted $S_A$ and $S_C$, respectively. The respective average amplitudes of these samples are denoted $F_B$, $F_A$ and $F_C$. When $S_B$ is the zero sample, then $S_A$ must be −1 and its average amplitude $F_A$ is equal to the average amplitude computed for the sample denoted M−1. When $S_B$ is the sample denoted M−1, $S_C$ is equal to the sample M and its average amplitude $F_C$ is equal to that computed for the zero sample. A parabolic interpolation between these three samples yields an instant x defined by the equation:

$$x = B - \frac{1}{2} \frac{(B-A)^2(F_B - F_C) - (B-C)^2(F_B - F_A)}{(B-A)(F_B - F_C) - (B-C)(F_B - F_A)} \quad (1)$$

The value of x must be between 0 and M. When x<0, M must be added and when $x \geq M$, M must be subtracted from the value of x obtained by means of the equation (1). The step 452 may be iterated several times so as to improve the precision of the result by replacing B in the equation (1) with the value of x computed at the previous iteration and by assigning to $F_B$, $F_A$, $F_C$ and B, A, C, respectively, the amplitude of the sample at the instant x and the amplitudes of the two samples near x, among A, B and C as well as the corresponding sampling instants.

What is claimed is:

1. A receiver for a packet transmission system comprising:
   receiving means for receiving a signal at a symbol frequency,
   oversampling means for generating oversamples from the received signal at a frequency which is a multiple of the symbol frequency, and
   a device for identifying, based on the generated oversamples, a delay corresponding to an optimal sampling instant of the received signal, the device comprising a first low-pass filter for filtering the oversamples, the filtered oversamples used to identify the delay, the device further comprising a second low-pass filter operable to filter the oversamples and centering means for centering the second low-pass filter as a function of said delay.

2. A receiver as claimed in claim 1, in which the second low-pass filter is a digital filter having a Nyquist edge whose coefficients are determined by said centering means as a function of said delay.

3. A receiver as claimed in claim 1, in which the device for identifying the delay further comprises:
- a computing member for determining a maximum of average amplitudes of the filtered oversamples, and
- an interpolator for computing a polynomial through at least three of said average amplitudes including the maximum amplitude, and for deriving said delay therefrom.

4. A system for packet transmission comprising a transmitter and a receiver, the receiver comprising:
- receiving means for receiving a signal at a symbol frequency,
- oversampling means for generating oversamples from the received signal at a frequency which is a multiple of the symbol frequency, and
- a device for identifying, based on the generated oversamples, a delay corresponding to an optimal sampling instant of the received signal, the device comprising a first low-pass filter for filtering the oversamples, the filtered oversamples used to identify the delay, the device further comprising a second low-pass filter operable to filter the oversamples and centering means for centering the second low-pass filter as a function of said delay.

5. A method, comprising:
- receiving a signal,
- oversampling the received signal to generate oversamples,
- filtering the generated oversamples using a first low-pass filter;
- identifying, based on the filtered oversamples, a delay corresponding to an optimal sampling instant of the received signal,
- centering a second low-pass filter as a function of said delay, and
- low-pass filtering the generated oversamples using the centered second low-pass filter.

6. A method, comprising:
- receiving a signal,
- oversampling the received signal to generate oversamples, and
- identifying, based on the generated oversamples, a delay corresponding to an optimal sampling instant of the received signal, wherein identifying the delay comprises parabolic interpolation for determining a maximum of average amplitudes of said samples and for deriving said delay therefrom.

7. An apparatus, comprising:
- a first low-pass filter operable to receive and filter oversamples of a received signal;
- a delay identifier coupled to the first low-pass filter and operable to identify a delay corresponding to an optimal sampling instant of the received signal;
- a second low-pass filter operable to receive and filter the oversamples of the received signal; and
- a centering mechanism coupled to the delay identifier and the second low-pass filter and operable to center the second low-pass filter as a function of the delay.

8. A receiver, comprising:
- a mixer operable to mix a received signal and a local oscillator signal to produce a mixed received signal;
- a first filter operable to at least partially eliminate frame frequencies in the mixed received signal;
- an oversampler operable to generate oversamples of the mixed received signal;
- a memory operable to store the generated oversamples;
- a device for identifying, based on the stored oversamples, a delay corresponding to an optimal sampling instant of the received signal, the device comprising a second filter for filtering the oversamples, the filtered oversamples used to identify the delay, the device further comprising a third filter operable to filter the oversamples and centering means for centering the third filter as a function of the delay;
- a decimator operable to receive from the third filter a plurality of the oversamples and to select one of the oversamples as an optimal sample.

* * * * *